US008905793B2

(12) United States Patent
Golko et al.

(10) Patent No.: US 8,905,793 B2
(45) Date of Patent: Dec. 9, 2014

(54) CONTACTS FOR AN ELECTRICAL CONNECTOR

(75) Inventors: Albert J. Golko, Saratoga, CA (US); Eric S. Jol, San Jose, CA (US); Miguel A. Lara-Pena, Gilroy, CA (US); Makiko K. Brzezinski, Santa Clara, CA (US); Edward Siahaan, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 194 days.

(21) Appl. No.: 13/607,554

(22) Filed: Sep. 7, 2012

(65) Prior Publication Data

US 2014/0073206 A1    Mar. 13, 2014

(51) Int. Cl.

| | |
|---|---|
| *H01R 24/00* | (2011.01) |
| *H01R 43/16* | (2006.01) |
| *H01R 13/03* | (2006.01) |
| *B29C 45/14* | (2006.01) |
| *H01R 13/405* | (2006.01) |
| *H01R 13/02* | (2006.01) |
| *H01R 43/02* | (2006.01) |
| *H01R 12/57* | (2011.01) |

(52) U.S. Cl.
CPC ............... *H01R 13/02* (2013.01); *H01R 43/16* (2013.01); *H01R 13/03* (2013.01); *H01R 12/57* (2013.01); *B29C 45/14* (2013.01); *H01R 13/405* (2013.01); *H01R 43/0263* (2013.01); *H01R 43/0256* (2013.01)
USPC ......................................................... 439/660

(58) Field of Classification Search
USPC ............. 439/660, 638, 887, 885, 736, 65, 72, 439/78, 84, 90, 363, 218, 607.01, 607.41, 439/76.1, 607.22; 174/59, 359; 361/748, 361/813
See application file for complete search history.

(56) References Cited

U.S. PATENT DOCUMENTS

| | | | |
|---|---|---|---|
| 1,132,094 A | 3/1915 | Hosford | |
| 3,939,559 A | 2/1976 | Fendley et al. | |
| 8,517,751 B1 * | 8/2013 | Golko et al. | 439/218 |
| 2009/0093136 A1 | 4/2009 | Hiew et al. | |
| 2013/0075149 A1 * | 3/2013 | Golko et al. | 174/359 |
| 2013/0095701 A1 * | 4/2013 | Golko et al. | 439/660 |
| 2013/0244491 A1 * | 9/2013 | Sarwar et al. | 439/655 |

FOREIGN PATENT DOCUMENTS

| | | |
|---|---|---|
| FR | 2561457 A1 | 9/1985 |
| WO | 2011/150403 A1 | 12/2011 |

OTHER PUBLICATIONS

Partial Search Report for International PCT Application No. PCT/US2013/035909, mailed on Jul. 9, 2013, 7 pages.
International Search Report and Written Opinion for International PCT Application No. PCT/US2013/035909, mailed on Oct. 31, 2013, 17 pages.
Office Action for Australian Application No. 2013205340, mailed Jul. 30, 2014, 3 pages.

* cited by examiner

*Primary Examiner* — Renee Luebke
*Assistant Examiner* — Harshad Patel
(74) *Attorney, Agent, or Firm* — Kilpatrick Townsend & Stockton LLP

(57) ABSTRACT

An improved electronic contact assembly for electrical connectors is disclosed. A plurality of elongated metallic contacts may be formed, each having one or more protrusions that enable precision alignment within a connector. A plurality of the contacts may be insert-molded in a dielectric frame which may have alignment tabs, resilient alignment bosses, alignment posts and crushable combs, all enabling precise alignment of contacts within a connector.

10 Claims, 18 Drawing Sheets

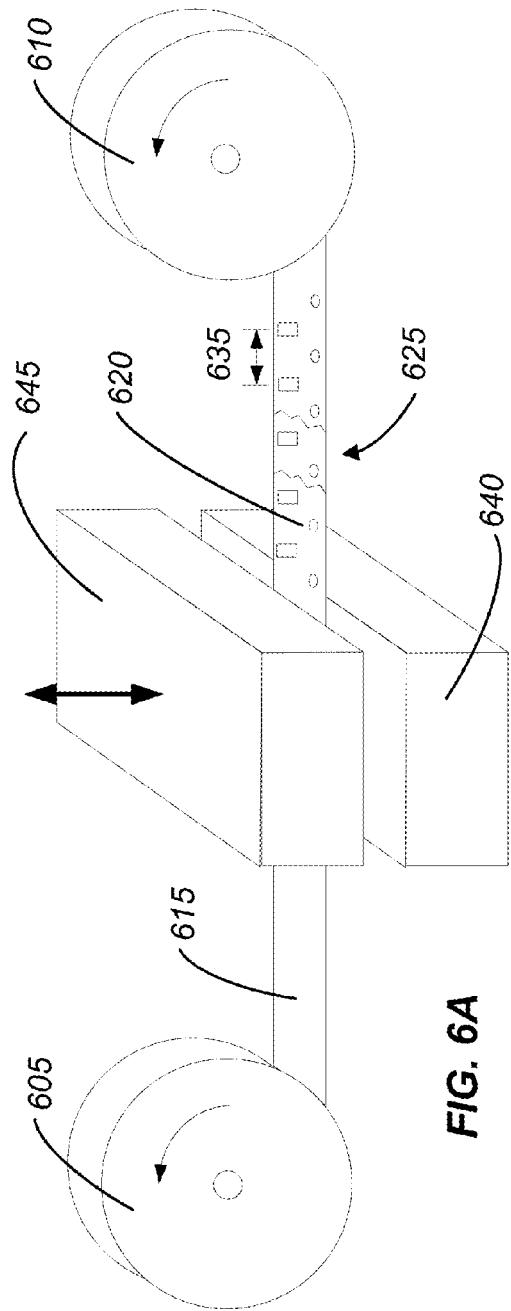
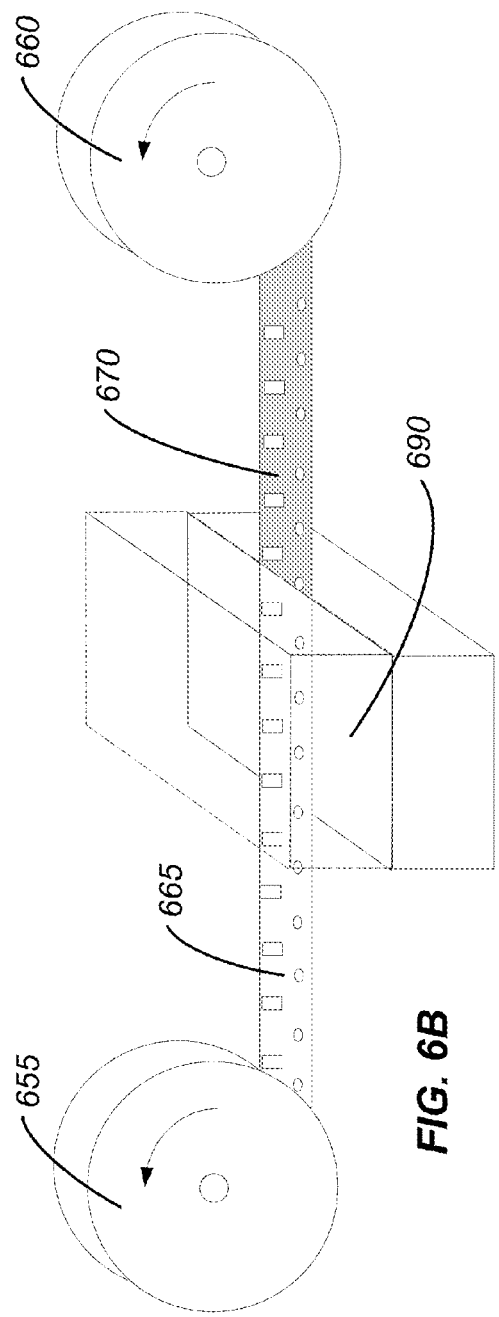

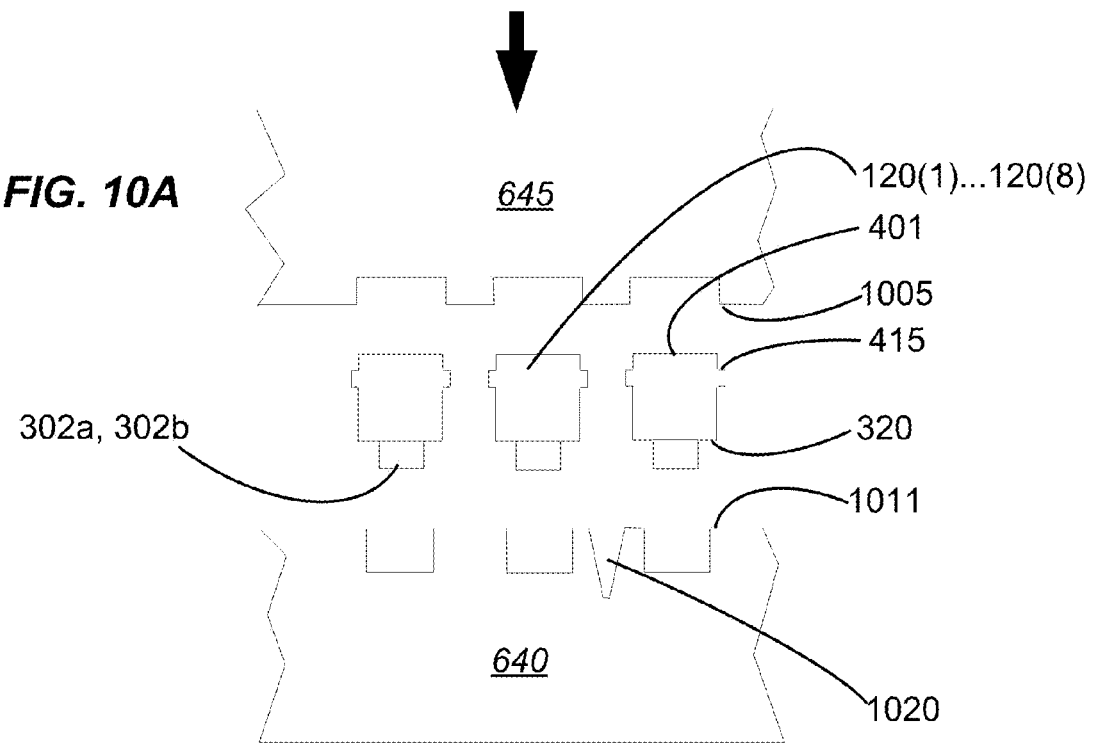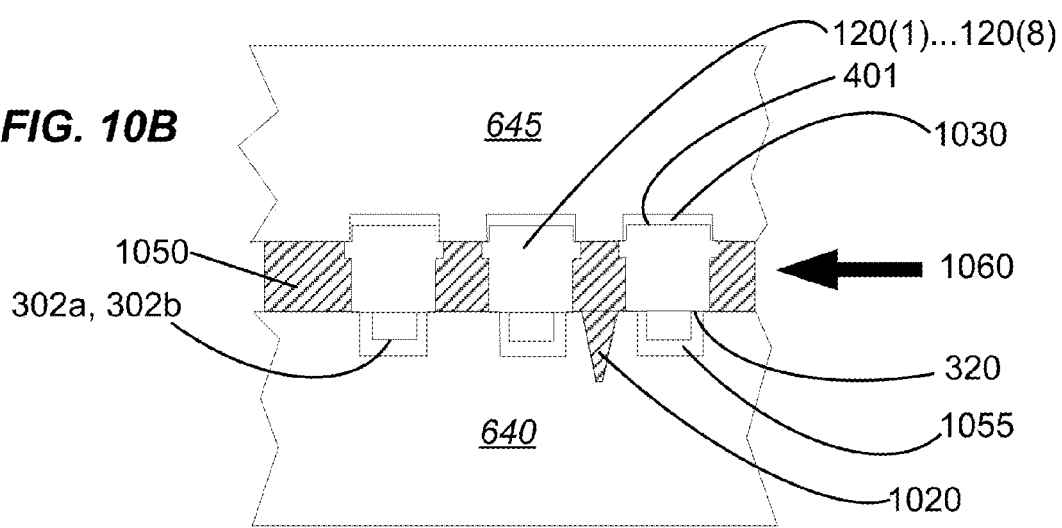

CONTACTS FOR AN ELECTRICAL CONNECTOR

BACKGROUND OF THE INVENTION

The present invention relates generally to electrical connectors and in particular to electrical contact assemblies for electrical connectors. A wide variety of electronic devices are available for consumers today. Many of these devices have connectors that that facilitate communication with and/or charging of a corresponding device. These connectors often interface with other connectors through cables that are used to connect devices to one another. Sometimes, connectors are used without a cable to directly connect the device to another device, such as a charging station or a sound system.

As smart-phones, media players and other electronic devices become more compact, a limiting factor on the size of a particular device may be one or more of the connectors incorporated into the device. As an example, receptacle connectors are sometimes positioned on one or more of the side surfaces of portable media devices. The thickness of such portable media devices may be limited by the thickness of the receptacle connector or connectors incorporated into the device. Smaller and thinner receptacle connectors may allow the portable media device to be designed smaller. Since such receptacle connectors typically include contacts positioned within an insertion cavity that is sized to hold a corresponding plug connector, there is a desire to have the mating plug connector smaller and thinner as well. Some plug connectors, such as a standard USB 2.0 connector, include a metal shield that surrounds the plug connector contacts forming a cavity in which the contacts are positioned. The shield may provide some level of protection against electrical interference but adds to the overall thickness of the portion of the plug connector that is inserted into the receptacle.

New connectors that such as the external contact connector just described as well as other connectors, may require new features and/or changes to commonly used connector components to be manufactured to more precise tolerances associated with the smaller size and to withstand the rigors of everyday use over multiple thousands of use cycles.

BRIEF SUMMARY OF THE INVENTION

Embodiments of the invention pertain to connect contacts, methods of manufacturing such contacts, a contact assembly and methods of manufacturing a connector using the contact assembly among other things. While the techniques of the invention can be used in a variety of different connectors, some embodiments of the invention are particularly useful for connectors that include contacts that positioned at an external surface of a plug connector and are thus not positioned within a cavity or surrounded by a metal or other type of shield as done in some prior art connectors. The lack of such a shield enables plug connectors according to certain embodiments of the invention to be thinner than had a shell been included and makes certain embodiments of the invention particularly useful in the manufacture of especially small or thin connectors.

Some embodiments relate to the formation of electronic contacts that may have one or more protrusions from a bottom surface and a substantially planar top contact surface. In some embodiments the contacts are unitary, and in other embodiments the contacts are comprised of a top plate and a bottom plate that are bonded together. In some embodiments the two plates are processed in a reel-to-reel leadframe blanking, forming and plating process and are laser welded together. The top plate and the bottom plate may have a ledge disposed on their periphery. Some embodiments of the bottom plate have a localized region of reduced thickness to improve the laser welding process.

Some embodiments of the invention relate to a contact assembly formed from a plurality of electronic contacts retained within a unitary dielectric frame. The contact assembly may be soldered to a PCB within a connector. In some embodiments the plurality of electronic contacts are precisely positioned in X, Y and Z dimensions by an insert-molding process that forms the dielectric frame. The dielectric frame may hold the contacts in precise X, Y and Z alignment during subsequent processing. Further, the dielectric frame may comprise alignment tabs, resilient alignment bosses, alignment posts and crushable combs that may work in conjunction with precision assembly tools to precisely position the top surface of the plurality of contacts within a connector. Further, in some embodiments, precise vertical positioning of the contact assembly within the connector may require solder bumps on the PCB and protrusions from the bottom of the electronic contacts to accommodate manufacturing tolerances.

Some embodiments of the invention relate to connectors that employ a contact assembly attached to a PCB, as discussed above, and are subsequently over molded with a dielectric material. One or more ledges features may be formed on the periphery of the electronic contacts to lock the contacts into the over mold material and secure them within the connector.

To better understand the nature and advantages of the present invention, reference should be made to the following description and the accompanying figures. It is to be understood, however, that each of the figures is provided for the purpose of illustration only and is not intended as a definition of the limits of the scope of the present invention.

BRIEF DESCRIPTION OF THE DRAWINGS

FIG. 6A is a diagram that illustrates a reel-to-reel manufacturing system in accordance with an embodiment of the invention.

FIG. 6B is a diagram that illustrates a reel-to-reel manufacturing system in accordance with an embodiment of the invention.

FIG. 10A is a diagram that illustrates an insert-molding manufacturing system in accordance with an embodiment of the invention.

FIG. 10B is a diagram that illustrates an insert-molding manufacturing system in accordance with an embodiment of the invention.

DETAILED DESCRIPTION OF THE INVENTION

Certain embodiments of the present invention relate to electrical contacts employed in electronic connectors. While the present invention can be useful to produce electrical contacts for a wide variety of connectors, some embodiments of the invention are particularly useful for producing contacts for connectors that are especially small, as described in more detail below. Embodiments of the invention may enable electronic contacts, in especially small connectors, to be precisely positioned, resulting in increased reliability and improved performance of electronic connectors.

Figure 1:
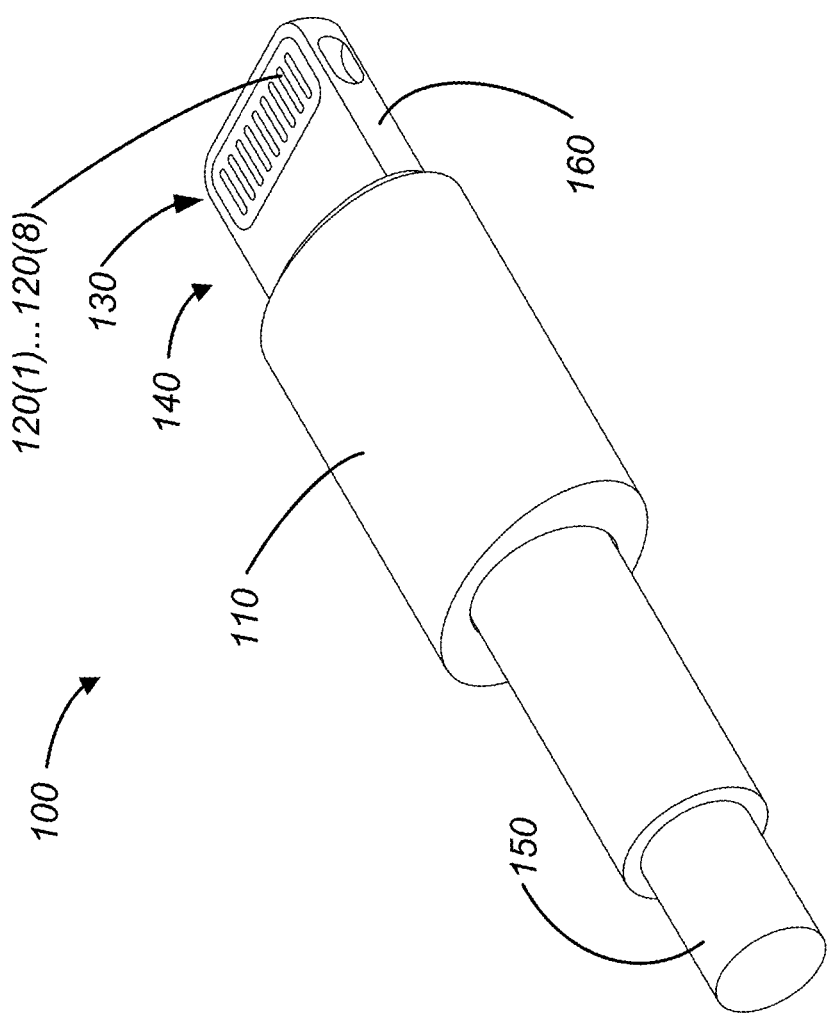
FIG. 1 is a diagram that illustrates an example of a connector plug with external contacts.

FIG. 1 is a simplified perspective view of an exemplary plug connector 100 that may benefit from embodiments of the invention Plug connector 100 includes a connector tab 140 that is sized to be inserted into a cavity in a corresponding receptacle connector (not shown). Tab 140 includes a metal ground ring 160 that surrounds a contact assembly 130. Contact assembly 130 may contain a plurality of external elongated electrical contacts 120(1) . . . 120(8) retained in a dielectric frame (not shown). This particular embodiment has eight electrical contacts, however other embodiments may have more or less electrical contacts. Connector 100 further comprises a connector body 110 and a cable bundle 150.

Figure 2A:
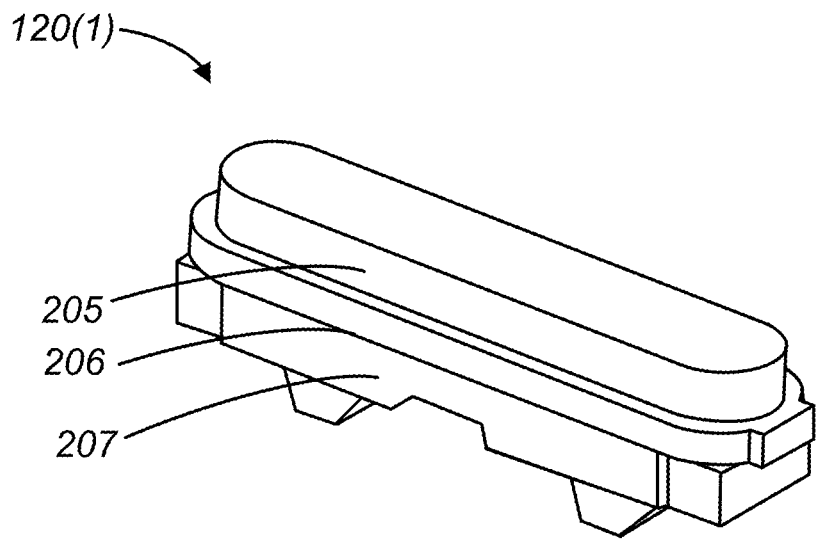
FIG. 2A is a diagram that illustrates a top perspective view of an electrical contact in accordance with an embodiment of the invention.
Figure 2B:
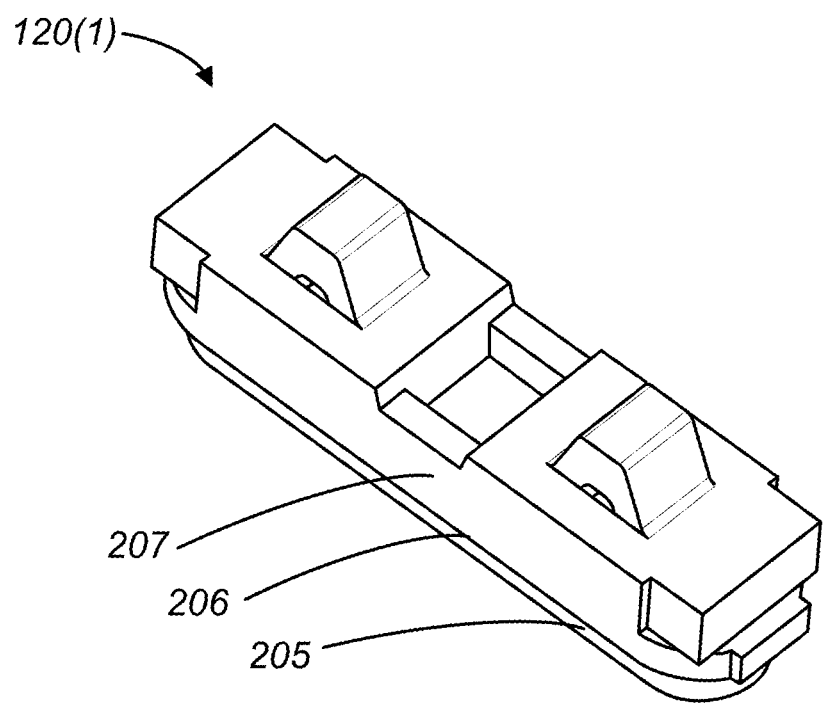
FIG. 2B is a diagram that illustrates a bottom perspective view of an electrical contact in accordance with an embodiment of the invention.

FIGS. 2A and 2B show top and bottom perspective views, respectively, of an exemplary elongated electrical contact 120(1) employed in plug connector 100. Electrical contact 120(1) may be comprised of two plates, a top contact plate 205 and a bottom contact plate 207 bonded together at interface 206. However, in some embodiments contact 120(1) may be a substantially unitary structure. In one embodiment the overall height of the electrical contact is less than 1.5 mm, and in another embodiment between 0.75 mm and 0.25 mm. In one embodiment the overall width of the electronic contact is less than 1.0 mm, and in another embodiment between 0.75 mm and 0.25 mm. Also, in one embodiment, electronic contact 120(1) is at least three times as long as it is wide and in another embodiment it is at least 5 times as long as wide.

Figure 3A:
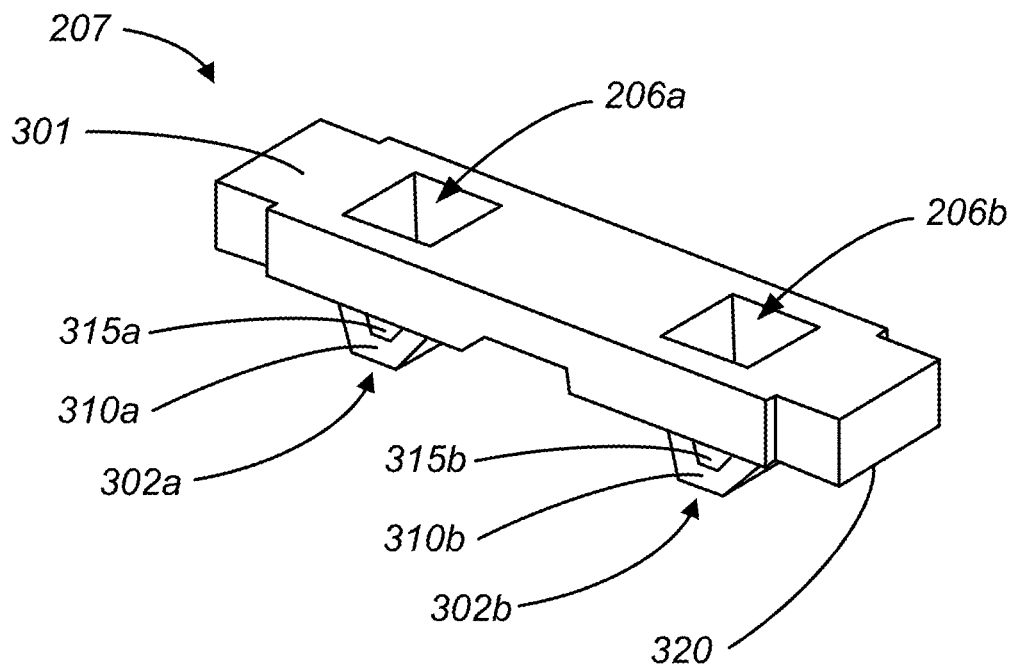
FIG. 3A is a diagram that illustrates a top perspective view of a bottom contact plate in accordance with an embodiment of the invention.
Figure 3B:
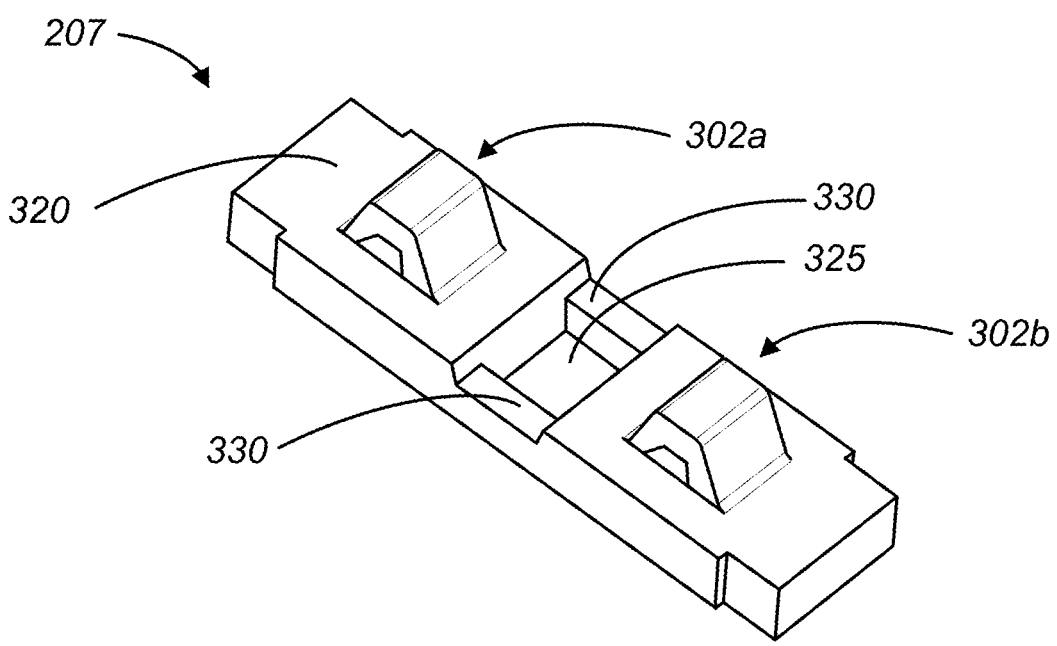
FIG. 3B is a diagram that illustrates a bottom perspective view of a bottom contact plate in accordance with an embodiment of the invention.

FIGS. 3A and 3B depict top and bottom perspective views of bottom contact plate 207, respectively. Bottom contact plate 207 may have a substantially planar top surface 301 with one or more cavities 206a, 206b. Bottom contact plate 207 may also have a substantially planar bottom surface 320 that may be substantially parallel with top surface 301. Bottom surface 320 may have one or more protrusions 302a, 302b that extend from the bottom surface to a distal end 310a, 310b. Protrusions 302a, 302b may be useful for soldering contact 102(1) in an alignment within a connector such that a top surface of contact 120(1) is coplanar with the top surfaces of contacts 120(2) . . . 120(8), as described in more detail below. Protrusions may have openings 315a, 315b that extend through the width of each protrusion. Bottom surface 320 may also have one or more recess portions 325 that result in a localized region of reduced thickness. Recess portion 325 may have one or more adjacent walls 330.

Figure 3C:
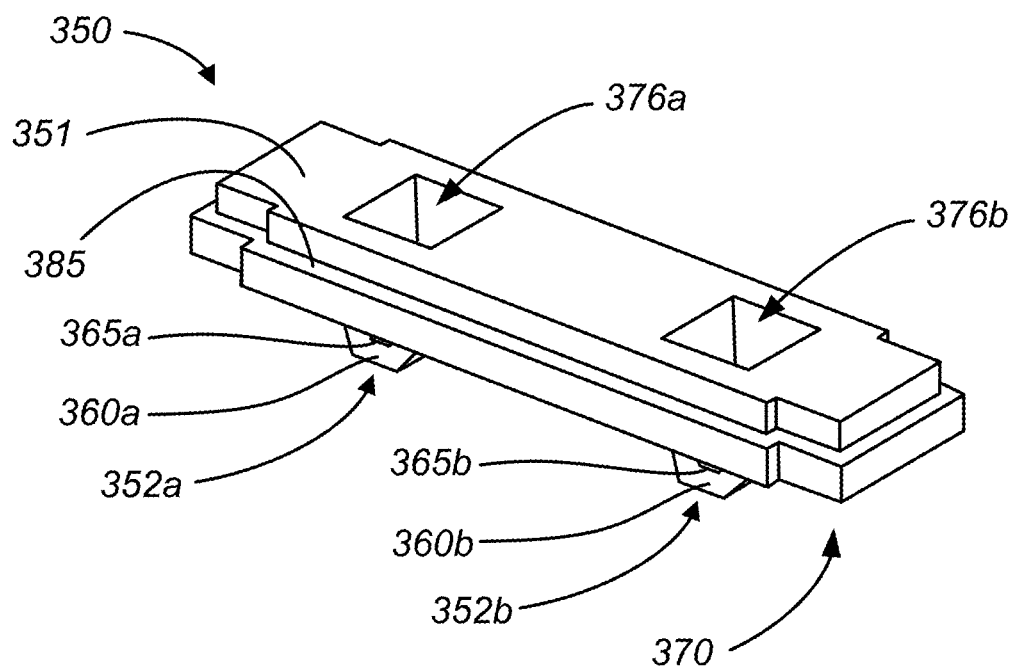
FIG. 3C is a diagram that illustrates a top perspective view of a bottom contact plate in accordance with an embodiment of the invention.

FIG. 3C depicts a top perspective view of an alternative embodiment of a bottom contact plate 350. Bottom contact plate 350 may have a substantially planar top surface 351 with one or more cavities 376a, 376b. Bottom contact plate 351 may also have a substantially planar bottom surface 370 that may be substantially parallel with top surface 351. Top contact plate 350 may further have a lower surface 370 that has a perimeter that is greater than the perimeter of top surface 351. The difference in perimeters may result in the formation of an annular ledge 385 disposed around the perimeter of the bottom contact plate. Bottom surface 370 may have one or more protrusions 352a, 352b that extend from the bottom surface to a distal end 360a, 360b. Protrusions 352a, 352b may be useful for aligning contact 102(1) in a connector, which will be described in more detail below. Protrusions may have openings 365a, 365b that extend through the width of each protrusion. Bottom surface 370 may be substantially similar to bottom surface 320 of bottom contact plate 207 depicted in FIG. 3B. Further, bottom contact plate 350 may have one or more recess portions 325 (see FIG. 3B) that result in a localized region of reduced thickness. Recess portion 325 may have one or more adjacent walls 330 (see FIG. 3B).

In some embodiments bottom contact plates 207, 350 may be made from copper or a copper alloy like phosphor-bronze, for example. In other embodiments a different conductive material may be used. In some embodiments the bottom contact plate may be plated with one or more metals. In one embodiment the bottom contact plate may be first plated with one or more layers of nickel and may be subsequently plated with gold.

Figure 4A:
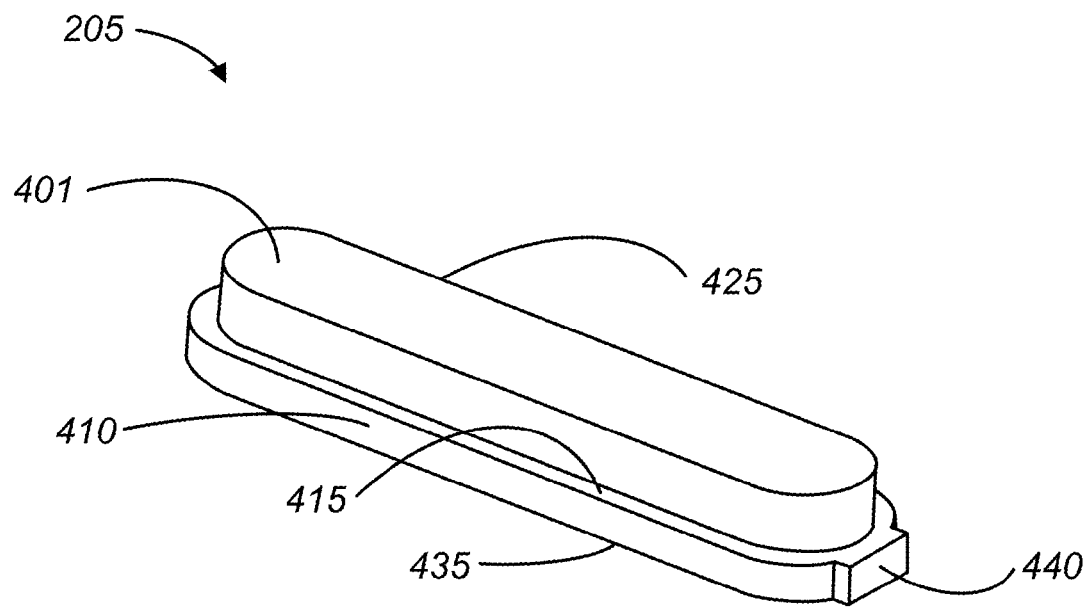
FIG. 4A is a diagram that illustrates a top perspective view of a top contact plate in accordance with an embodiment of the invention.
Figure 4B:
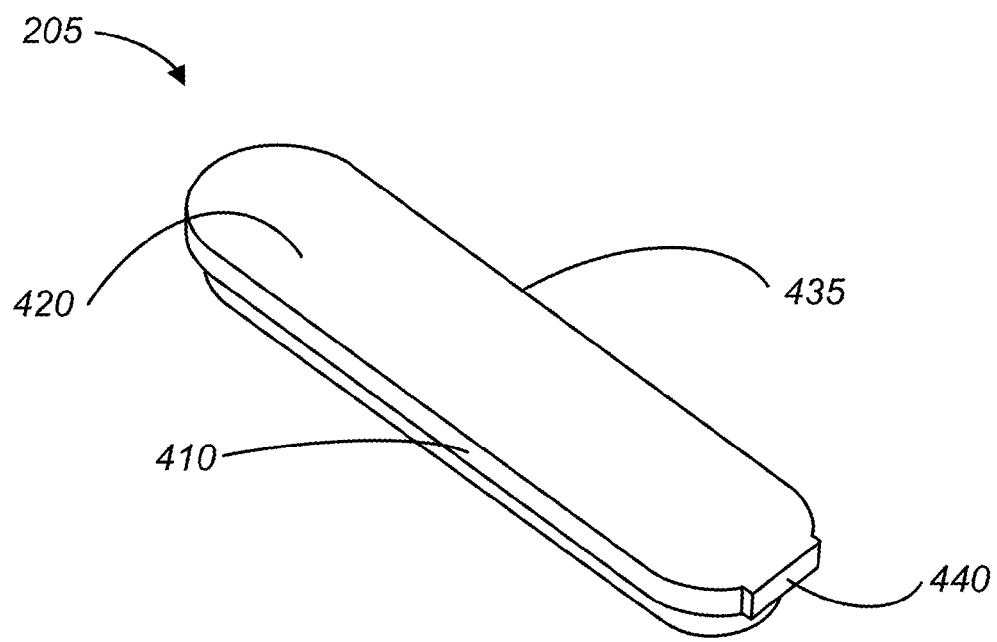
FIG. 4B is a diagram that illustrates a bottom perspective view of a top contact plate in accordance with an embodiment of the invention.

FIGS. 4A and 4B depict top and bottom perspective views, respectively, of top contact plate 205. Top contact plate 205 may have a substantially planar contact surface 401 that intimately and physically interfaces with an electrical contact in a mating receptacle connector (not shown). Top contact plate 205 may further have a lower portion 410 that has a perimeter 435 that is greater than contact surface perimeter 425. The difference in perimeters 425 and 435 may result in the formation of an annular ledge 415 disposed around the perimeter of the top contact plate. Top contact plate 205 may have a substantially planar lower surface 420 that may be substantially parallel with contact surface 401. The lower portion 410 may have a tie bar attachment region 440. In some embodiments, top contact plate 205 may be made from copper or a copper alloy like phosphor-bronze, for example. In one embodiment the top contact is made from stainless steel. In other embodiments a different conductive material is used. In some embodiments the top contact plate may be plated with one or more metals. In one embodiment the top contact plate may be first plated with nickel and may be subsequently plated with gold. In another embodiment, the top contact plate may be plated with a multi-layer nickel underplate comprising a leveling nickel layer that is applied to the contact plate material, a subsequent layer of sulfumate nickel over the leveling nickel, and a layer of high-phosphorous nickel over the sulfumate nickel that may be subsequently plated with gold. Further details regarding methods and processes of multi-layer nickel underplating may be found in U.S. patent application Ser. No. 13/250,920, which is herein incorporated by reference in its entirety.

Figure 5:
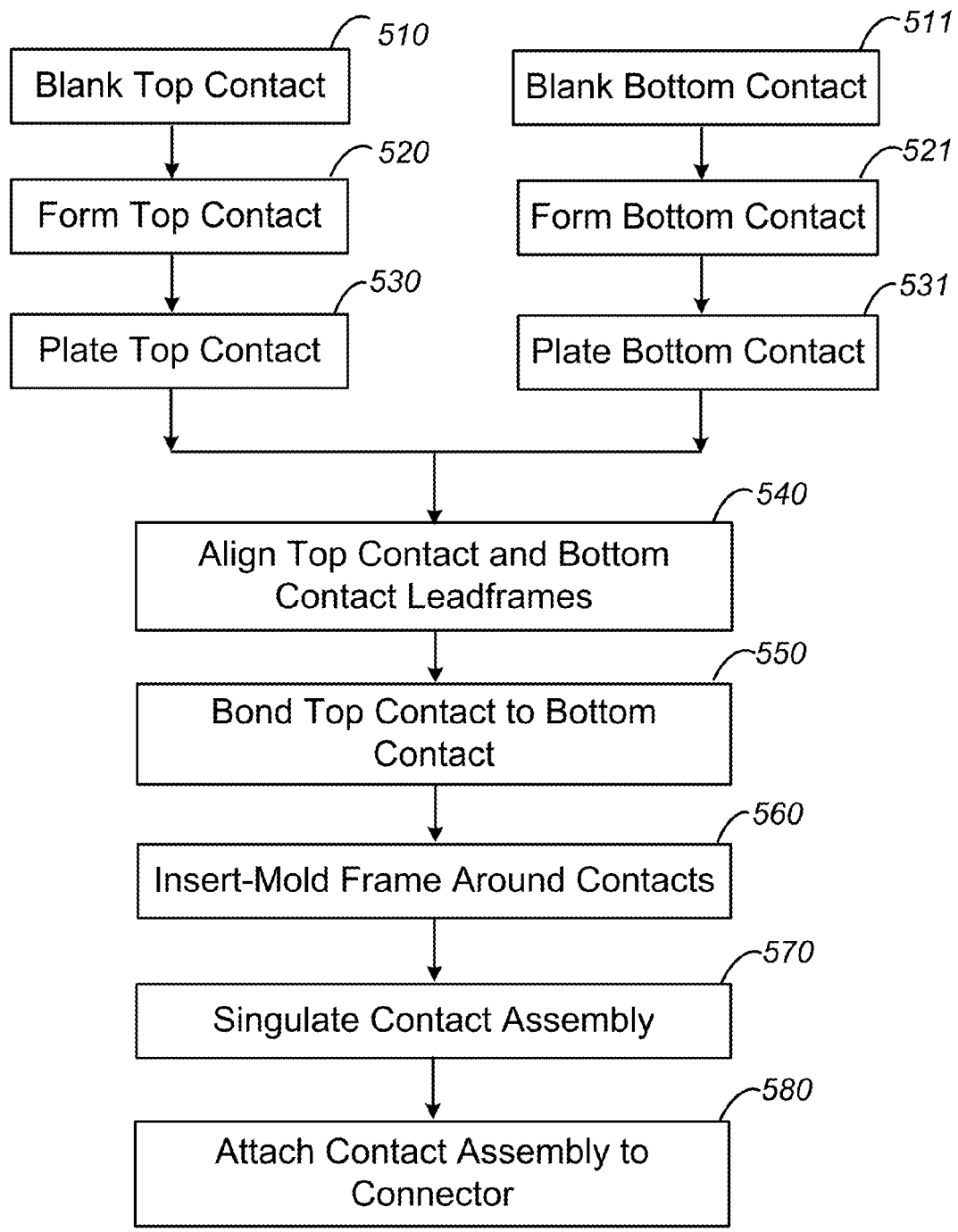
FIG. 5 is a process by which a contact assembly and a connector in accordance with an embodiment of the invention can be manufactured.

Reference is now made to FIGS. 5-12 to illustrate an exemplary manufacturing process for one embodiment of contacts 120, contact assembly 130 and connector 100 (see FIG. 1). FIG. 5 is a flow chart illustrating the general steps associated with the manufacture and assembly of contact assembly 130 and its integration into exemplary connector 100 (see FIG. 1). FIGS. 6-12 depict electrical contacts 120(1) . . . 120(8), contact assembly 130, and connector 100 at various stages of manufacture. These processes illustrate the manufacturing process of one particular embodiment and it is understood that numerous other manufacturing processes may be employed without departing from the invention.

Now referring to FIGS. 6A and 6B, the manufacture of electrical contacts 120(1) . . . 120(8) may be initiated, employing an exemplary reel-to-reel manufacturing process (FIG. 5, steps 510-550; FIGS. 6-9). FIG. 6A depicts an exemplary reel-to-reel stamping or forming process for manufacturing metallic components attached to a leadframe. A de-spooling reel 605 may contain a length of raw leadframe material 615. Raw leadframe material 615 may be any type of metal, including alloys. In one embodiment the raw leadframe material is an alloy of phosphor-bronze and is less than one mm thick. The de-spooling reel may rotate in a counter-clockwise direction and allow raw leadframe material 615 to enter one or more sets of die 640, 645. In one embodiment, die 640 is stationary and die 645 travels in up and down cycles repeatedly. With each down cycle, die set 640, 645 may perform a blanking operation in which portions of raw leadframe material 615 are removed. With each up cycle, additional raw leadframe material 615 may be advanced into die set 640, 645. This cycle may repeat many times per minute. Processed leadframe material 620 may exit the die set and be wound upon a re-spooling reel 610. Because of the cyclical nature of the die set, the blanked features may be repeated patterns separated by a pitch 635. Thus, the processed leadframe material 620 may be illustrated by a representative section 625.

The reel-to-reel manufacturing process depicted in FIG. 6A may also be used to perform a forming operation. In a forming operation, instead of die set 640, 645 removing material from raw leadframe material 615, features may be formed in the leadframe material. Some embodiments may use a multi-stage progressive die operation that has multiple die stages including blanking and forming operations. Some embodiments may employ single stage die operations while other embodiments may replace the blanking operation with a chemical etching process. Myriad equivalent blanking and forming processes may be employed without departing from the invention.

Figure 7A:
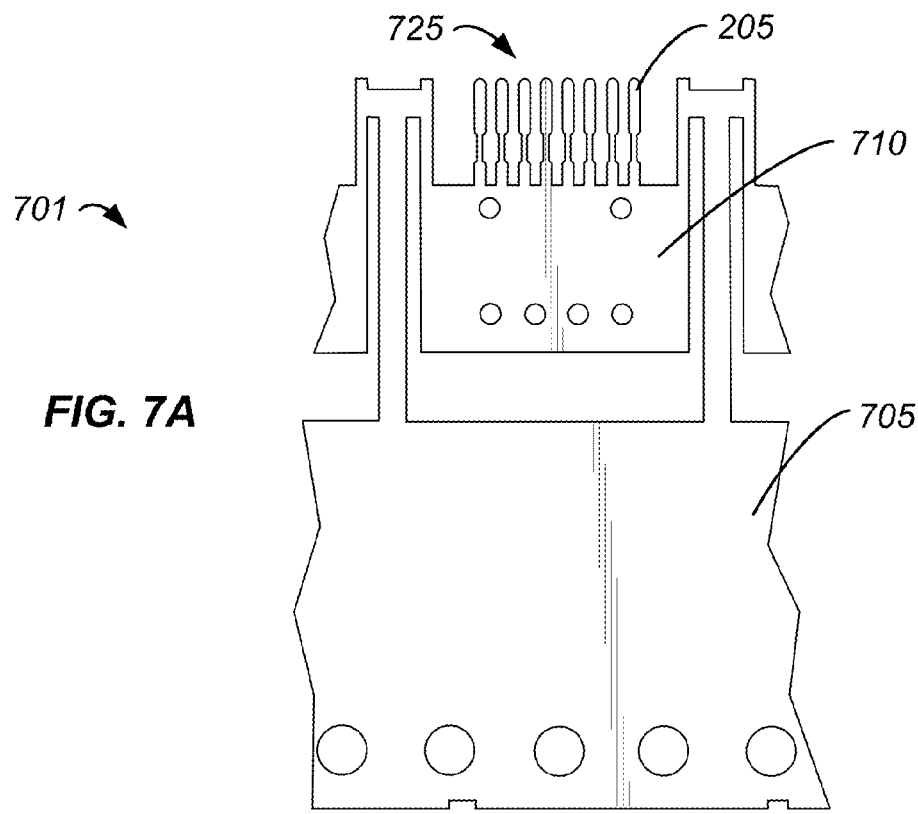
FIG. 7A is a diagram that illustrates a representative portion of a top contact leadframe in accordance with an embodiment of the invention.
Figure 7B:
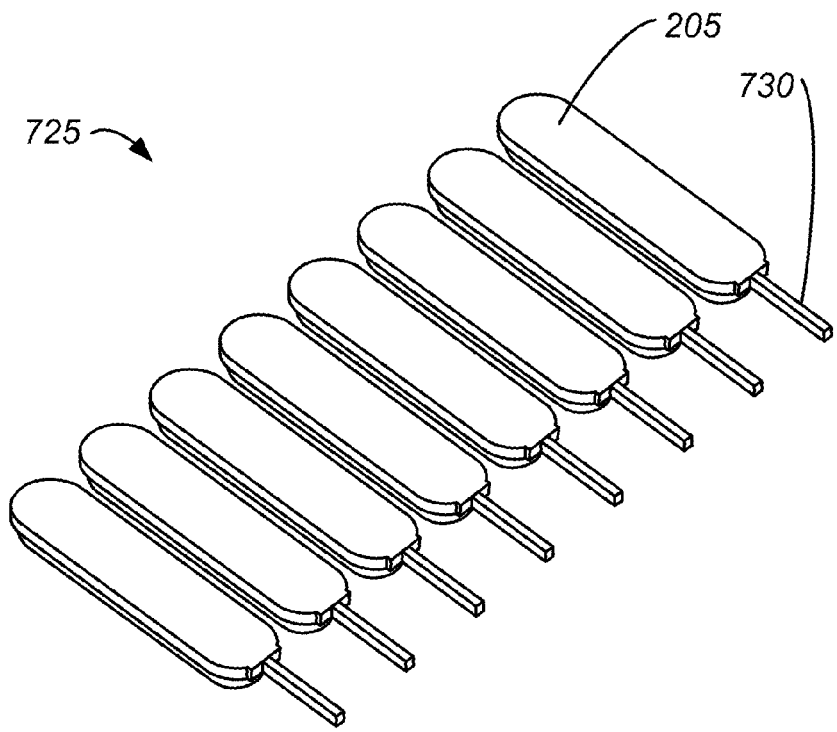
FIG. 7B is a diagram that illustrates a representative portion of a top contact leadframe in accordance with an embodiment of the invention.

An early step of assembly may involve blanking and forming raw leadframe material into one or more top contact plates 205 (see FIG. 4A) with a reel-to-to reel manufacturing process similar to that illustrated in FIG. 6A, (FIG. 5, steps 510, 520; FIGS. 7A-7B). FIG. 7A illustrates a representative section 701 of a blanked and formed leadframe used to manufacture top contact plate 205 (see FIG. 4A), for one embodiment. A carrier 705 may hold a subcarrier 710 to which a plurality of top contact plates 205 may be attached. Region 725 is illustrated in greater detail in FIG. 7B which shows that top contact plates 205 may remain attached to subcarrier 710 with tie bars 730 such that they can be wound on a re-spooling reel 610 (see FIG. 6A).

Figure 8A:
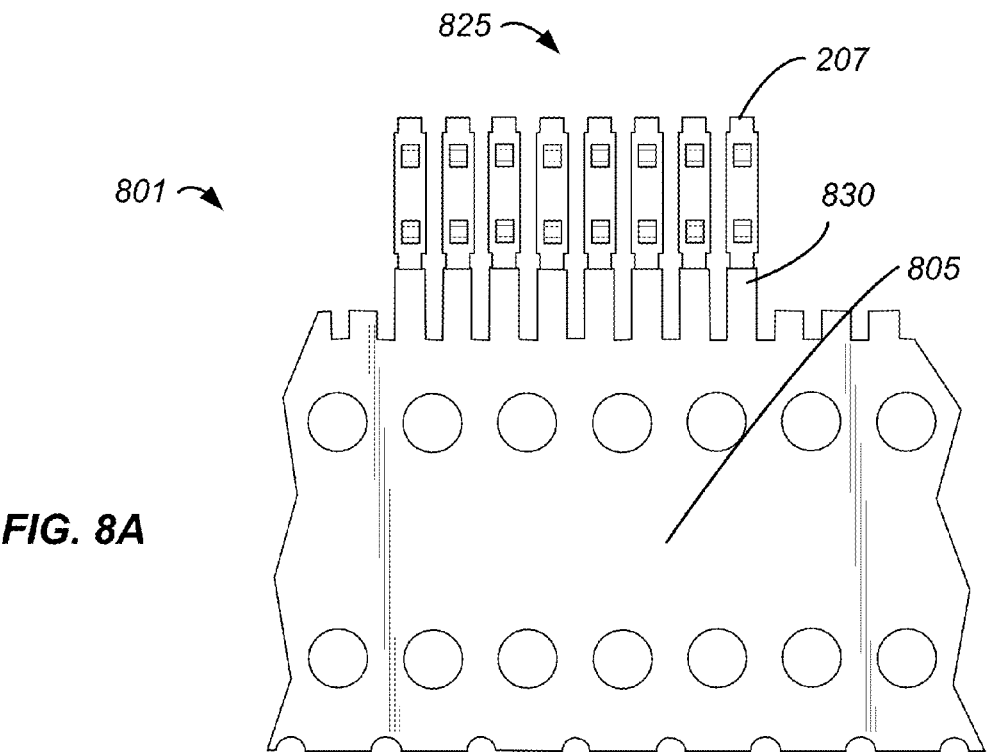
FIG. 8A is a diagram that illustrates a representative portion of a bottom contact leadframe in accordance with an embodiment of the invention.
Figure 8B:
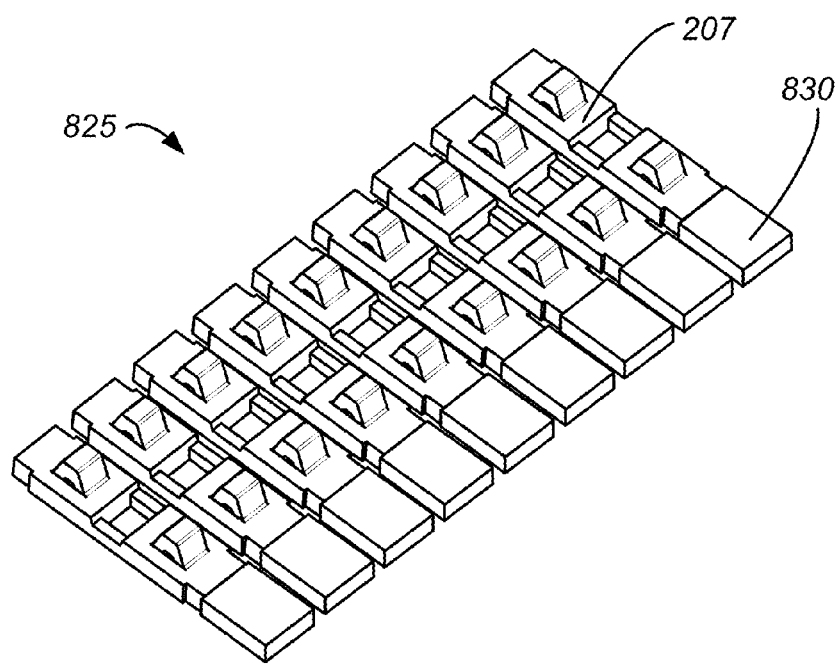
FIG. 8B is a diagram that illustrates a representative portion of a bottom contact leadframe in accordance with an embodiment of the invention.

Another early step of assembly, which may be done concurrent with, before or after steps 510 and 520, may involve blanking and forming raw leadframe material into one or more bottom contact plates 207 (see FIG. 3A) with a reel-to-to reel process similar to that illustrated in FIG. 6A, (FIG. 5, steps 511, 521; FIGS. 8A-8B). FIG. 8A illustrates a representative section 801 of a blanked and formed leadframe used to manufacture bottom contact plate 207, for one embodiment. A carrier 805 may be attached to a plurality of bottom contact plates 207. Region 825 is illustrated in greater detail in FIG. 8B which shows that bottom contact plates 207 may remain attached to carrier 805 with tie bars 830 such that they can be wound on a re-spooling reel 610 (see FIG. 6A).

After the top contacts and bottom contacts are formed, they may be cleaned and plated while still attached to the leadframe with a reel-to-to reel process similar to that illustrated in FIG. 6B, (FIG. 5, steps 530, 531; FIGS. 7A, 8A). A reel-to-reel manufacturing process, as depicted in FIG. 6B, may be employed for cleaning and plating operations. A de-spooling reel 655 may contain a length of blanked and formed leadframe material 665. The de-spooling reel may rotate in a counter-clockwise direction and allow blanked and formed leadframe material 665 to enter one or more cleaning and plating baths 690. The cleaned and plated leadframe material 670 may exit the cleaning and plating baths and be wound upon a re-spooling reel 660. In one embodiment the blanked and formed leadframe material 665 may go through three washing processes, a nickel plating process and a gold plating process. Myriad cleaning and plating processes may be used, including selective plating, without departing from the invention. Referring now to the flowchart in FIG. 5, in step 530 top contact leadframe 701 (see FIG. 7) may be plated using a reel-to-reel process. The bottom contact leadframe 801 (see FIG. 8) may also be plated using a reel-to-reel process (step 531). Leadframes 701, 801 may be plated with the same or with different processes.

Figure 9A:
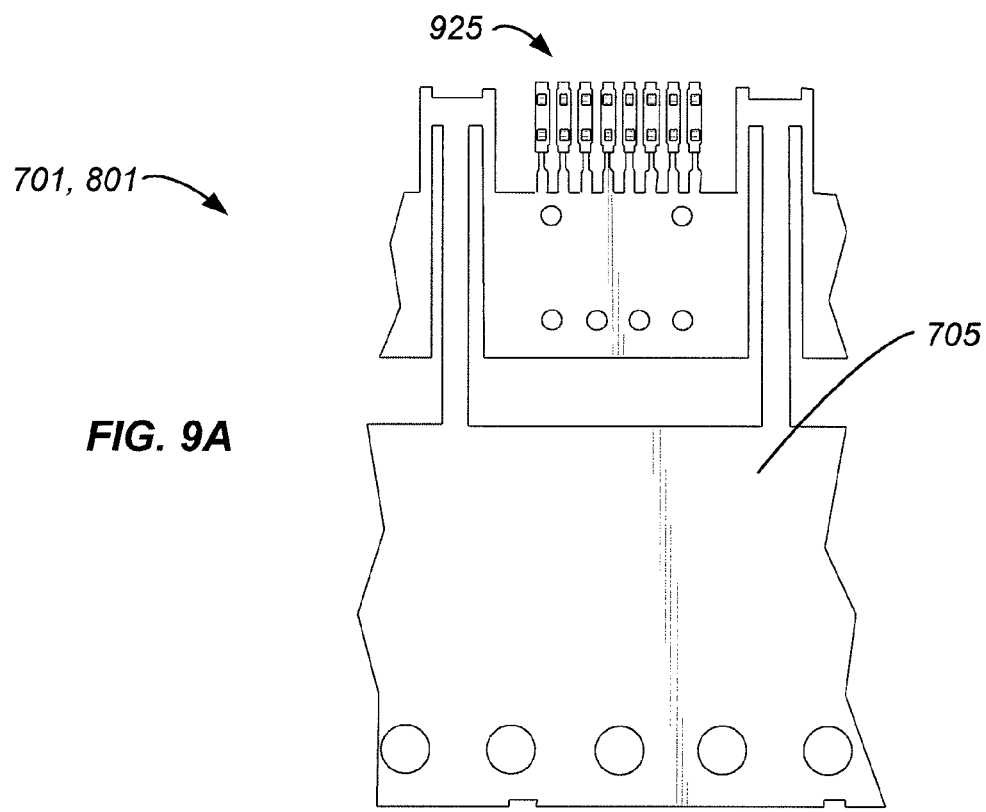
FIG. 9A is a diagram that illustrates a representative portion of a bottom contact leadframe disposed on top of a representative portion of a top contact leadframe in accordance with an embodiment of the invention.
Figure 9B:
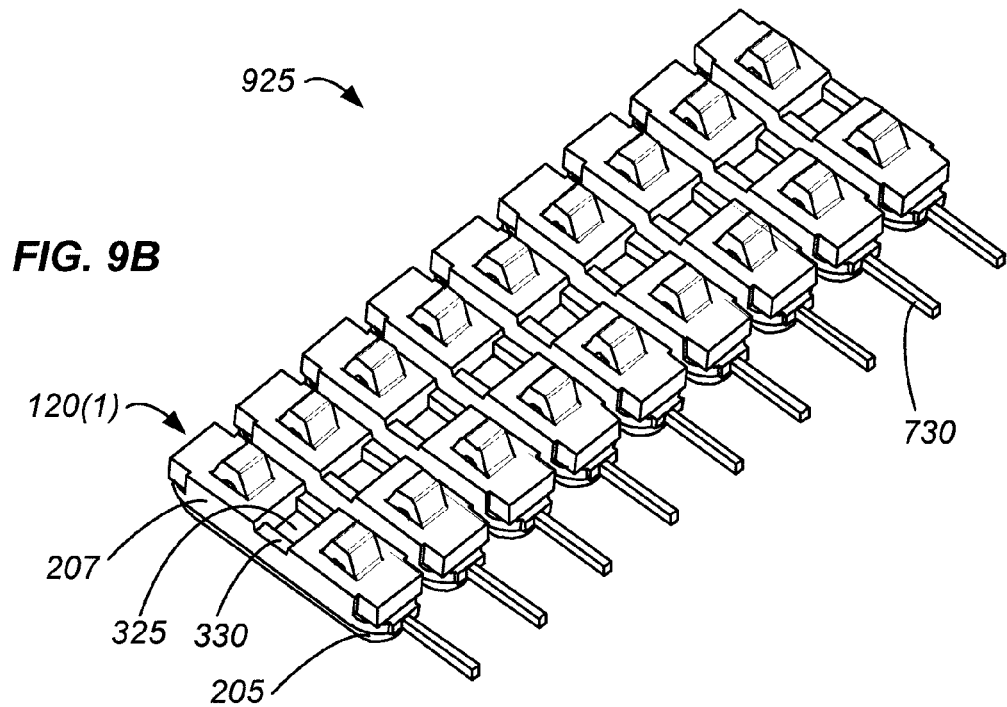
FIG. 9B is a diagram that illustrates a representative portion of a bottom contact leadframe disposed on top of a representative portion of a top contact leadframe in accordance with an embodiment of the invention.

The next step of assembly may involve aligning bottom contact leadframe 801 over top contact leadframe 701 (FIG. 5, step 540; FIGS. 9A-9B). Leadframes 701 and 801 may be aligned such that top surface 301 (see FIG. 3A) of bottom contact 207 physically touches and is aligned on lower surface 420 (see FIG. 4B) of top contact 205. In some embodiments the alignment process is performed with an automated system that incorporates computer-aided vision. FIG. 9A-9B depict leadframes 701, 801 on top of one another with bottom contact carrier 805 removed for clarity.

The next step of assembly may involve bonding bottom contact plate 207 to top contact plate 205, forming elongated electrical contacts similar to 120(1) depicted in FIG. 2A (FIG. 5, step 550; FIGS. 9A-9B) at each position where individual top and bottom contacts are mated. Region 925 of FIG. 9A is illustrated in greater detail in FIG. 9B. In one embodiment, a laser welder may be used to perform the bonding operation. More specifically, in FIG. 9B, a laser beam may be focused on recess portion 325 of bottom contact plate 207 such that the beam rapidly heats a localized portion of the bottom contact plate material near, or above its melting temperature, fusing the bottom contact plate to the top contact plate. In some embodiments, recess portion 325 may have a thinner cross-section than other portions of bottom contact 207. The thinner cross-section may enable faster heating from the laser and improved welding. Further, some embodiments of bottom contact plate 207 may have one or more walls 330 adjacent to recess portion 325. Walls 330 may serve the function of minimizing the deformation of bottom contact plate 207 during the bonding process. In some embodiments, bottom contact plate leadframe carrier 805 (see FIG. 8A) may be removed and bonded electrical contacts 120(1) remain attached to top contact plate leadframe carrier 705 by tie bars 730. In one embodiment, bottom contact plate leadframe carrier 805 may be removed by breaking tie bars 830 (see FIG. 8B) attached to bottom contact plates 207 with the aid of V-notches formed in the tie bars. In another embodiment, a laser may sever the tie bar connection. Myriad methods can be used to sever the tie bars without departing from the invention.

The next step of assembly may involve insert-molding a dielectric plastic material around one or more contacts 120(1) . . . 120(8) (FIG. 5, step 560; FIGS. 6A, 10-12C). Insert-molding may be accomplished with a system that looks and functions similar to the reel-to-reel blanking and forming machine illustrated in FIG. 6A. In one embodiment, die 640 is stationary and die 645 travels in up and down cycles repeatedly. With each down cycle, die set 640, 645 may perform an insert-molding operation around contacts 120(1) . . . 120(8) attached to leadframe carrier 705 (see FIG. 9A). With each up cycle, additional leadframe material may be advanced into die set 640, 645. This cycle may repeat several times per minute.

FIGS. 10A and 10B depict a simplified cross-section of die set 640, 645 and contacts 120(1) . . . 120(8) as employed in one embodiment. When the die set is in the open position as depicted in FIG. 10A, the contacts may be held in place by carrier 705 (see FIG. 9A) and are aligned with die set 640, 645. Upper die 645 may have close-out surfaces 1005 that seal against ledge 415 of top contact plate 205 (see FIG. 4A) on contacts 120(1) . . . 120(8). Lower die 640 may have close-out surfaces 1011 that seal against bottom surface 320 of bottom contact plate 207 (see FIG. 3B) on contacts 120(1) . . . 120(8). Lower die 640 may also have one or more comb formation recesses 1020.

FIG. 10B depicts die set 640, 645 in the closed position and after mold material 1050 has been injected. Upper die 645 may have clearance features 1030 such that the upper die only contacts ledge 415 of contacts 120(1) . . . 120(8) and not contact surface 401. Lower die 640 may also have clearance features 1055 such that the lower die only contacts bottom surface 320 of contacts 120(1) . . . 120(8) and not protrusions 302a, 302b. Upper die 645 may have close-out surfaces 1005 that may be precision machined such that all ledges 415 of the plurality of contacts 120(1) . . . 120(8) are forced to be substantially coplanar and precisely positioned in planar X and Y dimensions. In some embodiments, contacts 120(1) . . . 120(8) may be precisely manufactured such that when ledges 415 are substantially coplanar it forces contact surfaces 401 of the plurality of contacts to also be substantially coplanar. More specifically, in some embodiments, the insert-mold dies 640, 645 can position contact surfaces 401 to be within plus/minus 0.03 mm. In some embodiments contact surfaces can be within plus/minus 0.025 mm. In further embodiments, contact surfaces can be within plus/minus 0.02 mm, or less.

Figure 11A:
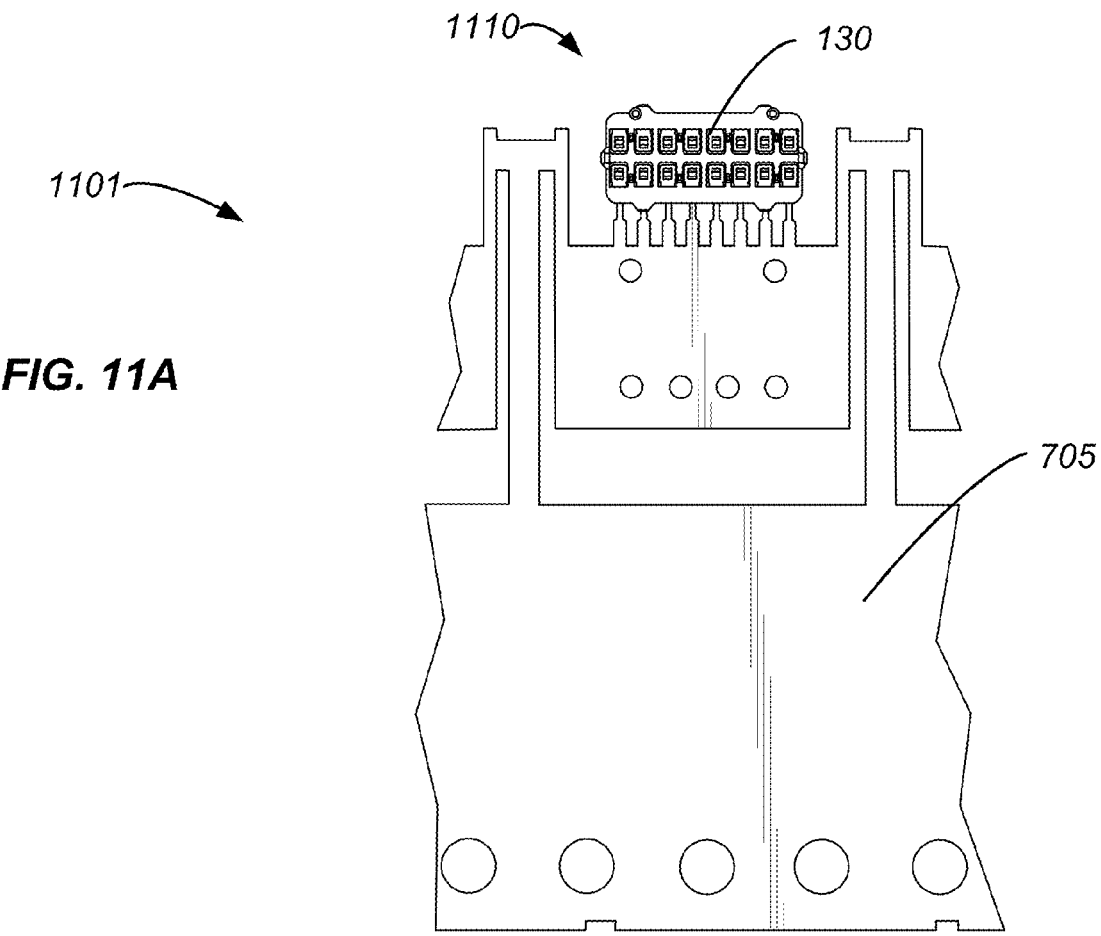
FIG. 11A is a diagram that illustrates a representative portion of a bottom contact leadframe disposed on top of a representative portion of a top contact leadframe after insert-molding in accordance with an embodiment of the invention.
Figure 11B:
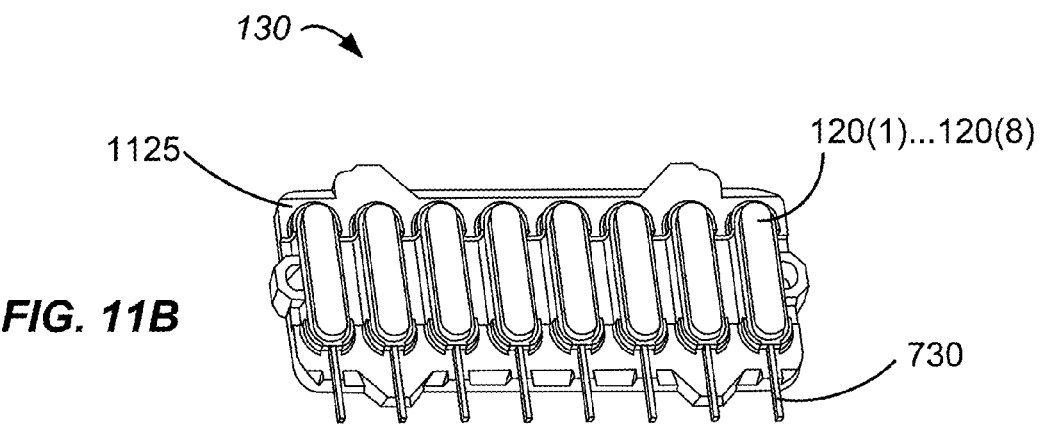
FIG. 11B is a diagram that illustrates a representative portion of a bottom contact leadframe disposed on top of a representative portion of a top contact leadframe after insert-molding in accordance with an embodiment of the invention.

Once die set 640, 645 is in the closed position, a dielectric insert-molding material 1050 may be injected from one or more ports as illustrated by arrow 1060. The dielectric material may be in a semi-liquid state and may fill all the voids between contacts 120(1) . . . 120(8) and any recesses in the die, such as comb recess 1020. In some embodiments the dielectric material may be polypropylene, while in other embodiments the dielectric material may be a liquid crystal polymer that may be partially filled with glass fiber. The injected dielectric material may then be cooled to at least partially solidify it such that die set 640, 645 may be opened and injected material 1050 will retain its shape. One or more ejector pins (not shown) may force the solidified dielectric material, along with contacts 120(1) . . . 120(8), out of the die set. FIGS. 11A and 11B depict one embodiment of an insert-molded leadframe after it exits the die set. FIG. 11A illustrates representative leadframe section 1101 with an insert-molded contact assembly 130 held to carrier 705 by top contact plate tie bars 730. FIG. 11B shows a more detailed top perspective view of contact assembly 130 with contacts 120 (1) . . . 120(8) held together by a dielectric frame 1125 formed by injected dielectric material 1050.

Figure 12A:
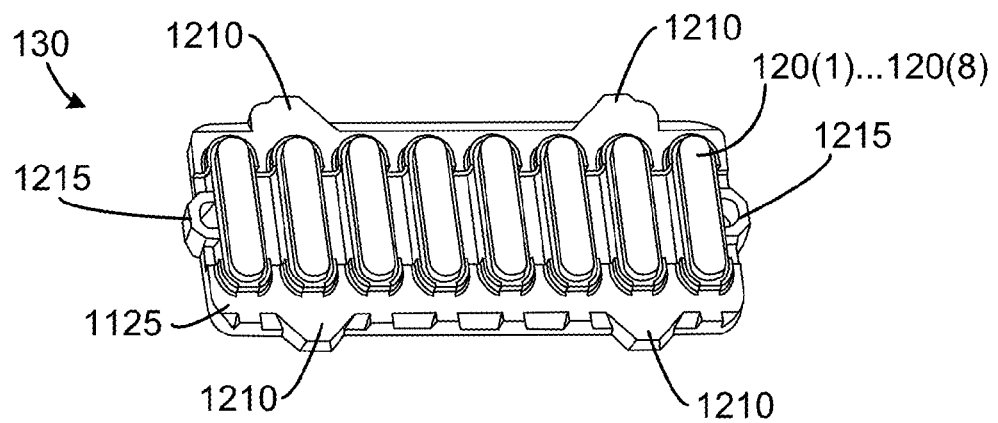
FIG. 12A is a diagram that illustrates top perspective view of a contact assembly in accordance with an embodiment of the invention.
Figure 12B:
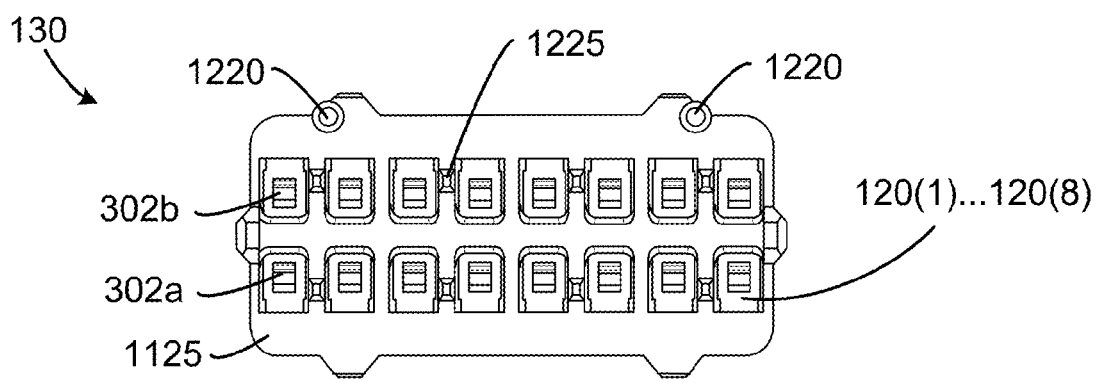
FIG. 12B is a diagram that illustrates bottom plan view of a contact assembly in accordance with an embodiment of the invention.
Figure 12C:
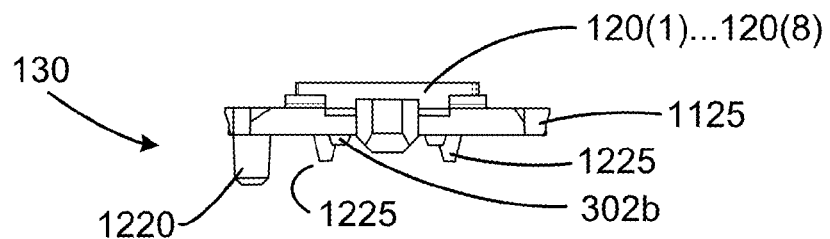
FIG. 12C is a diagram that illustrates side view of a contact assembly in accordance with an embodiment of the invention.

The next step of assembly may involve singulating contact assembly 130 from carrier 705, (step 570, FIGS. 12A-12C). In some embodiments, the singulation process may be performed in the final stage of the insert-molding die. In alternative embodiments the insert-molded leadframe may then be reeled onto a re-spooling reel 610 (see FIG. 6A) and the singulation process may be performed in a machine similar to that illustrated in FIG. 6A. In other embodiments the insert-molded leadframe material may be cut into sections and the sections may be employed in subsequent manufacturing processes. FIG. 12A shows a top perspective view of singulated contact assembly 130. FIG. 12B shows a planar bottom view and FIG. 12C shows a side view. Once carrier 705 (see FIG. 11A) has been removed, dielectric frame 1125 may maintain the plurality of contacts 120(1) . . . 120(8) in precise X, Y and Z alignment with one another throughout subsequent processes.

Each contact assembly 130 may include a molded frame 1125. One embodiment has eight contacts 120(1) . . . 120(8) that are insert-molded and secured by frame 1125. Frame 1125 may be equipped with one or more alignment posts 1220 that protrude from a bottom surface of the dielectric frame. Alignment posts 1220 may be tapered and may have a beveled distal end. In some embodiments, the dielectric frame may have two, four or more alignment tabs 1210 disposed on the perimeter of the frame. Some embodiments may also have resilient alignment bosses 1215 disposed on either end of contact assembly 130. Further, the dielectric frame may have one or more crushable combs 1225 that protrude from the bottom surface of the contact assembly 130. In one embodiment, at least four crushable combs 1225 are formed on the bottom surface of assembly 130.

Figure 13:
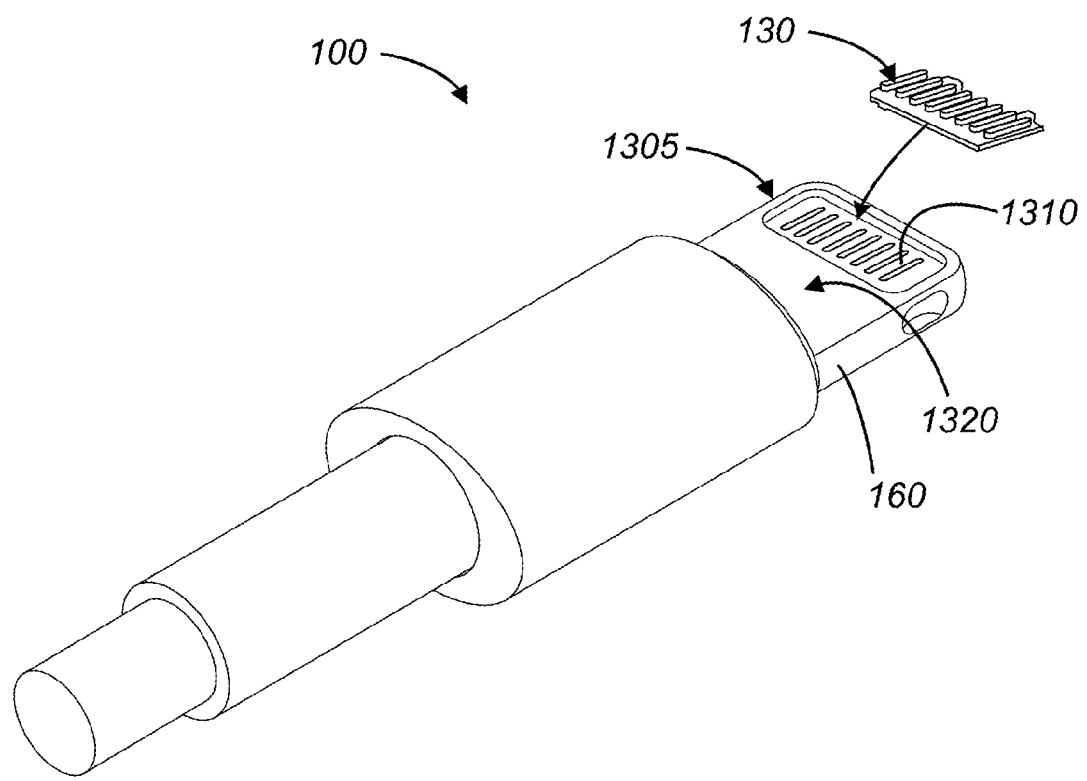
FIG. 13 is a diagram that illustrates an example of a connector plug with a contact assembly.

The next step of assembly may involve integrating contact assembly 130 into an exemplary connector such as connector 100 (see FIG. 1), (FIG. 5, step 580; FIGS. 13-16). Referring now to FIG. 13, one or more contact assemblies 130 may be integrated into electrical connector 100. In some embodiments a hot bar soldering process may be employed to precisely position contact assembly 130 in window 1305 of connector 100. Contact assembly 130 may be affixed to a PCB 1310 residing in window 1305. Further, a substantially flat surface 1320 may be machined or ground into ground ring 160 and may be used as a substantially flat alignment surface for contact assembly 130, as further illustrated below. As mentioned above, some embodiments of contact assembly 130 are particularly useful for producing contacts for connectors that are especially small. Embodiments of the invention may enable electronic contacts, for particularly small connectors, to be precisely positioned, resulting in increased reliability and improved performance. Some of the features that may enable precise positioning of contact assembly 130 may be better understood by illustrating the contact assembly integration process for one embodiment.

Figure 14A:
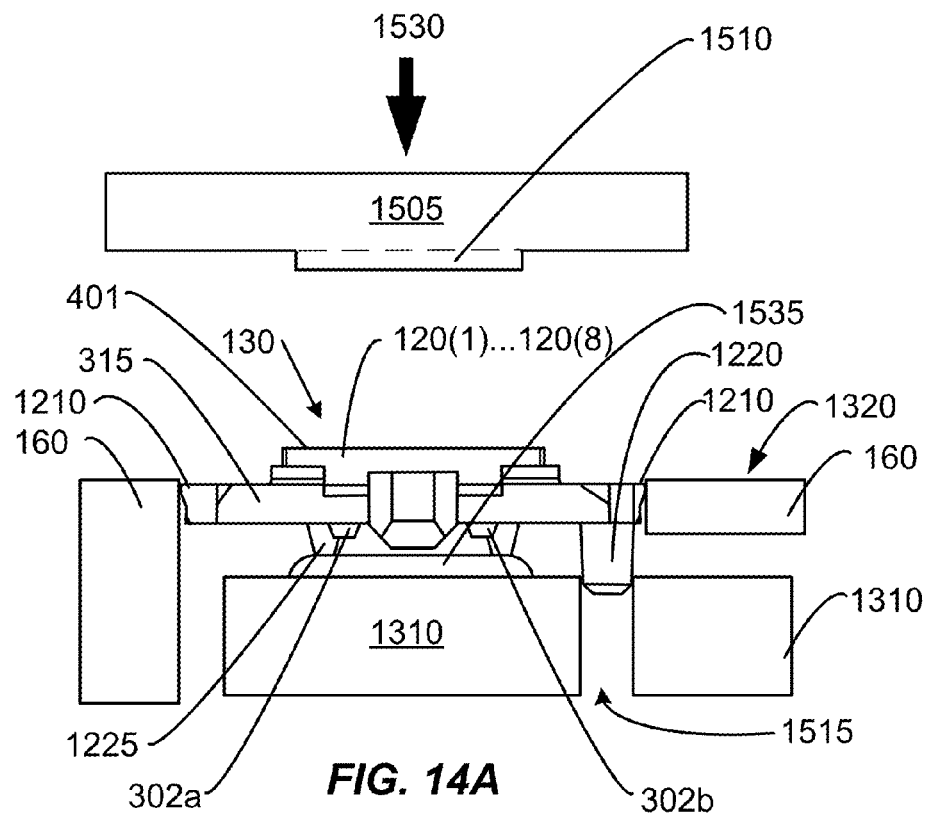
FIG. 14A is a diagram that illustrates a hot bar soldering system in accordance with an embodiment of the invention.
Figure 14B:
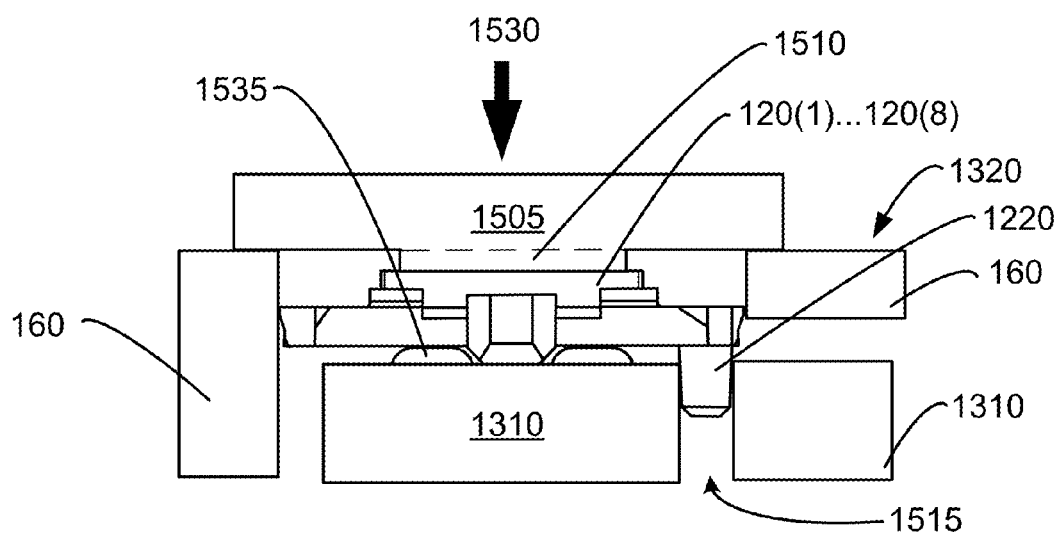
FIG. 14B is a diagram that illustrates a hot bar soldering system in accordance with an embodiment of the invention.

The contact assembly integration process for one embodiment is illustrated in FIGS. 14A and 14B. The detailed steps of the process are depicted in the flow chart in FIG. 15. The first step of the assembly process may comprise placing connector 100 in a fixture to hold the components in place (FIG. 15, step 1500; FIG. 13). The next step of assembly may comprise positioning contact assembly 130 in window 1305 of ground ring 160 (FIG. 15, step 1510; FIGS. 14A, 14B). Alignment posts 1220 of contact assembly 130 may be engaged with guide holes 1515 in PCB 1310. Contact assembly alignment tabs 1210 (see FIG. 12A) may precisely position contact assembly 130 in window 1305 (see FIG. 13). Crushable combs 1225 may be in physical contact with PCB 1310.

Figure 15:
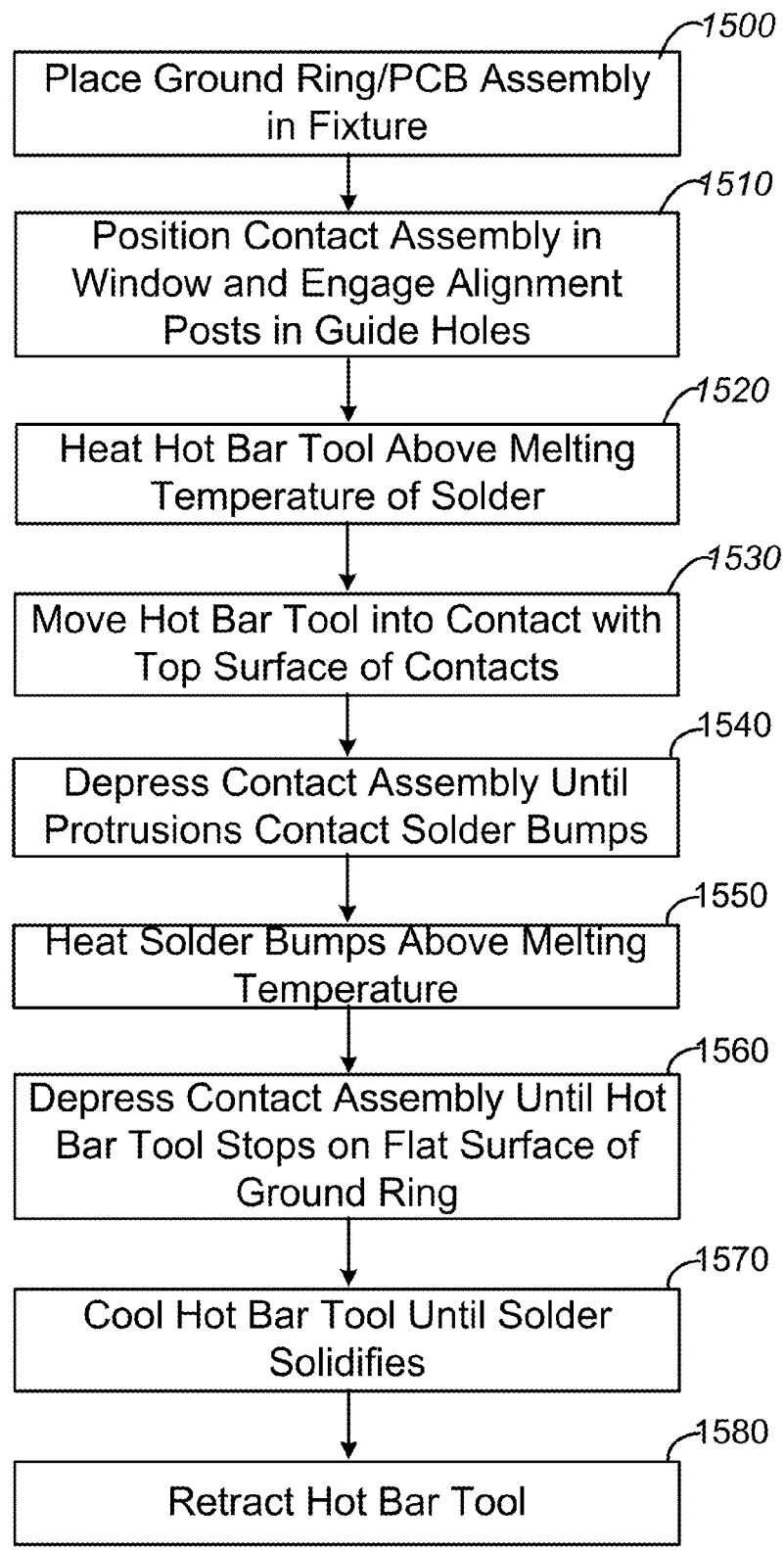
FIG. 15 is a process by which a contact assembly may be assembled to a connector in accordance with an embodiment of the invention.

The next step of assembly may comprise using a hot bar tool 1505 to assemble contact assembly 130 to PCB 1310 (FIG. 15, steps 1520-1580; FIGS. 14A, 14B). Prior to assembly, one or more solder bumps 1535 may be disposed on PCB 1310. The next step of assembly may comprise heating hot bar tool 1505 above the melting temperature of solder bumps 1535 (step 1520). For example, if solder bumps 1535 are composed of a tin/silver/copper alloy comprised of approximately three percent silver, one-half percent copper with the remainder tin, the hot bar tool may be heated above 221 degrees centigrade. The higher the temperature of the hot bar tool, the faster the solder may reflow.

In step 1530, the hot bar tool may travel down, in the direction of arrow 1530, towards contact assembly 130 until it physically touches top surface 401 of contacts 120(1) . . . 120(8). In step 1540, hot bar tool 1505 may push contact assembly 130 further in the direction of arrow 1530, partially deforming crushable combs 1225 against PCB 1310. The crushable combs may be designed specifically for this purpose and may impart a controlled amount of force resisting movement of contact assembly 130 in the direction of arrow 1530. Alignment tabs 1210 and alignment posts 1220 may keep the contact assembly precisely centered in window 1305 (see FIG. 13) during the assembly process. Step 1510 of hot bar tool 1505 may be precision formed to maintain top surface 401 of contacts 120(1) . . . 120(8) co-planar and at a controlled height during the attachment process. Further, dielectric frame 1125 (see FIG. 12A) may maintain the contacts in precise X, Y and Z alignment relative to one another during the attachment process.

In step 1540, the contact assembly may be further pushed in the direction of the arrow until contact protrusions 302a, 302b come into contact with solder bumps 1535. Hot bar tool 1505 may be configured to impart a controlled force in the direction of arrow 1530 at this time so no damage to the contact assembly results. Solder bumps 1535 may be pre-coated with flux. In some embodiments the coating of flux may not only improve the wetting of the solder to contact protrusions 302a, 302b it may also enable more efficient heat transfer from contacts 120(1) . . . 120(8) to the solder bumps. In step 1550, hot bar tool 1505 may transfer thermal energy through the contacts and into the solder bumps. Once an adequate amount of thermal energy has been transferred into the solder bumps, the solder bumps may transition to a liquid state when heated above their melting temperature. Once in a liquid state, the solder bumps offer little resistance to additional movement of contact assembly 130 in the direction of arrow 1530. In step 1560, the contact assembly may then be pushed further by the hot bar tool, causing increased deformation of crushable combs 1225 until hot bar tool 1505 "stops" on flat surface 1320 (see FIG. 13) of ground ring 160, causing further deformation of crushable combs. In some embodiments crushable combs 1225 may deform between 0.02 mm and 0.12 mm. In other embodiments the crushable combs may deform between 0.05 mm and 0.09 mm. In some embodiments the heating of the crushable combs by hot bar tool 1505 makes them easier to deform.

FIG. 14B depicts the stop position of hot bar tool 1505. In this figure it can be seen that step 1510 of hot bar tool 1505 may be used to precisely position top surface 401 of contacts 120(1) . . . 120(8) a known distance below flat surface 1320 (see FIG. 13) of ground ring 160. In some embodiments, step 1510 has a height between 0.1 and 0.01 mm and thus recesses top surface 401 of contacts 120(1) . . . 120(8) that same amount below flat surface 1320 of ground ring 160. In other embodiments, step 1510 is not included and the contacts are pressed flush with flat surface 1320. Also, during step 1560, contact protrusions 302a, 302b on the bottom surface of contact assembly 130 may be wetted by the liquefied solder bumps 1535. In some embodiments, liquefied solder may enter openings 315a, 315b (see FIG. 3A) in the protrusions, possibly resulting in increased joint strength. In step 1570, the hot bar tool may then be cooled until the liquefied solder bumps cool to a temperature below the liquidus temperature of the solder alloy and solidify. In step 1580, the hot bar may then be then retracted and the assembly can be removed from the fixturing.

Figure 14C:
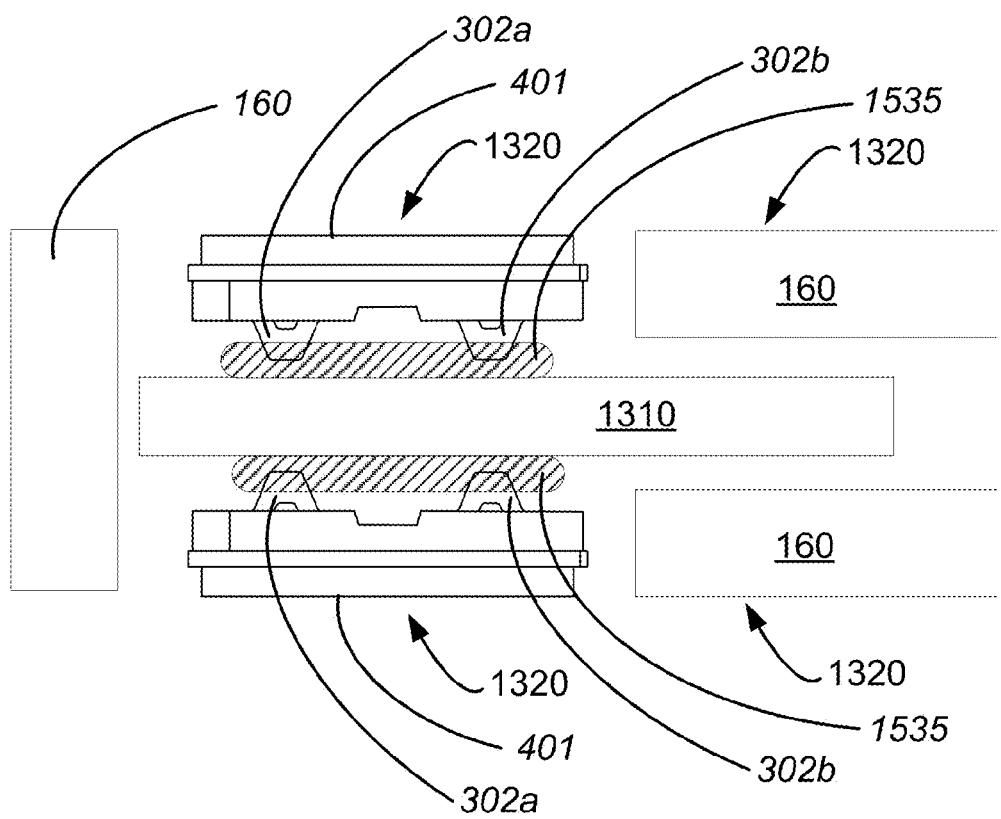
FIG. 14C is a diagram that illustrates an example of a contact assembly assembled to a connector in accordance with an embodiment of the invention.

During the descent and final positioning of contact assembly 130 in connector 100, alignment tabs 1210, resilient alignment bosses 1215 (see FIG. 12A), alignment posts 1220 and crushable combs 1225 may work in conjunction with precision hot bar step 1510 and flat surface 1320 on ground ring 160 to precisely position top surface 401 of contacts 120(1) . . . 120(8) within connector 100. More specifically, some embodiments that employ one or more of these features may enable top surface of contacts 401 to be positioned in connector 100 within a tolerance of plus/minus 0.03 mm. In some embodiments top surface of contacts 401 can be positioned within plus/minus 0.025 mm. In further embodiments, top surface of contacts 401 can be positioned within plus/minus 0.02 mm, or less. In some embodiments, as depicted in precise positioning of contact surfaces 401 relative to flat surface 1320 requires the solder bumps 1535 and contact protrusions 302a, 302b to accommodate manufacturing tolerances. FIG. 14C depicts a more detailed view of an embodiment with dual contact assemblies and the interaction of protrusions 302a, 302b with solder bumps 1535. More specifically, contact assemblies 130 may be placed in connector 100 relative to flat surfaces 1320, thus the vertical position of contact protrusions 302a, 302b relative to PCB 1310 may vary. In some embodiments that variation may be accommodated by the liquefied solder bumps 1535. Further, some embodiments may have one solder bump for both protrusions while other embodiments may have a separate solder bump for each protrusion. Some embodiments may have one contact receiving pad per contact on PCB 1310 and some embodiments may have more than one contact receiving pad per contact. In some embodiments the contact attachment process may be performed on one side of ground ring 160 at a time, while in other embodiments the process may be performed simultaneously on both sides of the ground ring.

Figure 16:
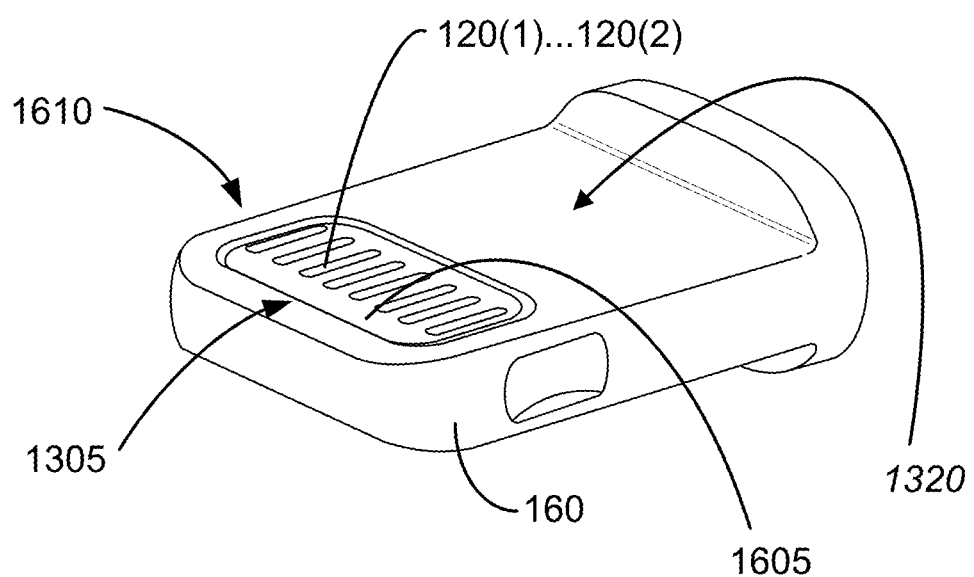
FIG. 16 is a diagram that illustrates an example of a connector plug with external contacts in accordance with an embodiment of the invention.

In some embodiments, connector 100 may undergo an additional assembly step wherein a partially assembled connector is placed in an insert-molding tool and a thermoplastic or similar dielectric overmold 1605 (see FIG. 16) is formed around contact assembly 130 and within window 1305 of ground ring 160 As depicted in FIG. 16, this process may provide a smooth and substantially flat mating surface 1610 in the contact region of ground ring 160. In some embodiments, dielectric overmold 1605 may be polyoxymethylene (POM). In other embodiments, dielectric overmold 1605 may be a nylon-based polymer. In some embodiments, mating surface 1610 may be disposed below flat surface 1320 of ground ring 160 and be substantially coplanar with the top surface 401 (see FIG. 4A) of contacts 120(1) . . . 120(8). In some embodiments the depression may extend around the entire perimeter of window 1305. In some embodiments, dielectric overmold 1605 may be used to aid in retaining contacts 120(1) . . . 120(8) within the connector. More specifically, some embodiments may benefit from ledges 415 (see FIG. 4A) on top contact plate 205 or ledges 385 (see FIG. 3C) on bottom contact plate 350 to secure contact assemblies 120(1) . . . 120(8) in dielectric overmold material 1605.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. An electrical connector contact comprising:
   an elongate top contact plate comprising a substantially planar contact surface defined by a contact surface perimeter, the contact surface disposed above a substantially parallel lower surface having a perimeter that is larger than the contact surface perimeter;
   an elongate bottom contact plate bonded at a substantially planar top surface to the lower surface of the top contact plate, and the bottom contact plate including at least two protrusions spaced apart along and extending from a bottom surface of the bottom contact plate away from the top contact plate.

2. The electrical connector contact set forth in claim 1 wherein the bottom contact plate further comprises a recess portion disposed in the bottom surface.

3. The electrical connector contact set forth in claim 2 wherein the bottom contact plate has a perimeter substantially equal to the perimeter of the lower portion of the top contact plate.

4. The electrical connector contact set forth in claim 2 wherein the bottom contact has a perimeter of the top surface that is less than a perimeter of the bottom surface.

5. The electrical connector contact set forth in claim 2 further comprising a recess portion disposed between the two protrusions.

6. A leadframe for use in an electrical connector contact, the leadframe comprising:
   a first leadframe with an elongate top contact plate comprising a substantially planar contact surface defined by a contact surface perimeter, the contact surface disposed above a substantially parallel lower surface having a perimeter that is larger than the contact surface perimeter;
   a second leadframe with an elongate bottom contact plate bonded at a substantially planar top surface to the lower surface of the top contact plate, and the bottom contact plate including at least two protrusions spaced apart along and extending from a bottom surface of the bottom contact plate away from the top contact plate.

7. An electrical connector contact comprising:
   an elongate top contact plate comprising a substantially planar contact surface defined by a contact surface perimeter, the contact surface disposed above a substantially planar lower surface, the top contact plate comprising plated stainless steel;
   an elongate bottom contact plate bonded at a substantially planar top surface to the lower surface of the top contact plate, bottom contact plate including at least two protrusions spaced apart along and extending from a bottom surface of the bottom contact plate away from the top contact plate, the bottom contact plate comprising a plated copper alloy.

8. The electrical connector set forth in claim 7 wherein at least one of the top contact plate or bottom contact plate includes a perimeter that is larger than the contact surface perimeter forming a ridge around the contact surface.

9. The electrical contact set forth in claim 7 wherein the top contact comprises an outer gold plating layer formed over a multilayer nickel plating layer.

10. The electrical contact set forth in claim 9 wherein the bottom contact comprises an outer gold plating layer formed over a nickel plating layer.

* * * * *